United States Patent
Kao

(10) Patent No.: US 9,104,776 B2
(45) Date of Patent: Aug. 11, 2015

(54) EFFICIENT IDENTITY MAPPING WITH SELF-CORRECTION FOR CASCADED SERVER SYSTEMS

(75) Inventor: I-Lung Kao, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1914 days.

(21) Appl. No.: 12/173,246

(22) Filed: Jul. 15, 2008

(65) Prior Publication Data

US 2010/0017425 A1    Jan. 21, 2010

(51) Int. Cl.
*G06F 17/30* (2006.01)
*H04L 29/06* (2006.01)
*H04L 29/08* (2006.01)
*H04L 29/12* (2006.01)

(52) U.S. Cl.
CPC .......... *G06F 17/30899* (2013.01); *H04L 63/08* (2013.01); *H04L 67/1002* (2013.01); *H04L 67/1023* (2013.01); *H04L 29/12084* (2013.01); *H04L 61/1523* (2013.01)

(58) Field of Classification Search
CPC ................... G06F 17/30899; H04L 29/12084; H04L 61/1523; H04L 67/1023
USPC .......................... 707/736, 737, 770
See application file for complete search history.

(56) References Cited

U.S. PATENT DOCUMENTS

| 5,644,720 | A  | * | 7/1997  | Boll et al. ...................... 709/227 |
| 6,795,866 | B1 | * | 9/2004  | Mankude et al. ............. 709/238 |
| 6,981,043 | B2 |   | 12/2005 | Botz et al. |
| 2002/0143909 | A1 |   | 10/2002 | Botz et al. |
| 2004/0250085 | A1 | * | 12/2004 | Tattan et al. .................. 713/186 |
| 2005/0160204 | A1 | * | 7/2005  | Wagner ............................. 710/33 |
| 2006/0069761 | A1 | * | 3/2006  | Singh et al. ................... 709/222 |
| 2006/0129817 | A1 | * | 6/2006  | Borneman et al. ............ 713/170 |
| 2007/0005801 | A1 |   | 1/2007  | Kumar et al. |
| 2010/0121882 | A1 | * | 5/2010  | Barrett et al. ................. 707/783 |

* cited by examiner

*Primary Examiner* — Mariela Reyes
*Assistant Examiner* — Soheila Davanlou
(74) *Attorney, Agent, or Firm* — Yee & Associates, P.C.; Steven L. Bennett

(57) ABSTRACT

A computer-implemented method, computer program product, and apparatus for identity mapping with self-correction for cascaded server systems is provided. A request to perform a business transaction is received. Responsive to performing a first server process of the business transaction, the servers necessary to perform the business transaction are identified, forming a set of identified servers. A user identity is retrieved for each server in the set of identified servers, wherein the user identity for each server in the set of identified servers is linked to a user registry of a server, forming a set of linked user identities. A data structure comprising the set of linked user identities is created. A user identity for a next server in the set of identified servers is retrieved from the data structure. In addition, the data structure is forwarded to a next server in the set of identified servers.

6 Claims, 5 Drawing Sheets

EFFICIENT IDENTITY MAPPING WITH SELF-CORRECTION FOR CASCADED SERVER SYSTEMS

BACKGROUND OF THE INVENTION

1. Field of the Invention

The present invention relates generally to data processing systems and more specifically to efficient identity mapping and self-correction for cascaded server systems.

2. Description of the Related Art

With a wide use of the Web Services technology and a trend of on-line business operations getting more complex, a business organization often needs to connect and integrate a number of internal special-purposed servers to accomplish the full functionality of various business transactions that the business delivers to its customers, partners, or employees. In a typical situation, all these servers form a cascaded client-server relationship, i.e., one server serving a specific function to its client acts as a client to another server. The term server encompasses a software application server process running on a server hardware. However, these servers may have existed before the establishment of the client-server cascading relationship, and each server may have its own user registry that resides locally, or on a remote server.

For a business transaction to proceed end-to-end along the client-server chain, a different user identity may need to be used on each server for authentication, authorization, auditing, or other purposes. Therefore, an identity mapping mechanism is usually employed to map a user identity recognized by one server to a different one recognized by another server.

In current identity mapping solutions, the identity mapping information is defined and stored in a common registry like the Lightweight Directory Access Protocol (LDAP) server, and an application programming interface (API) is provided to the server to map a user identity for one server to a user identity for another server. An application programming interface is any interface that enables one program to use facilities provided by another program, whether by calling that program, or by being called by the other program. An application programming interface may consist of classes, function calls, subroutine calls, descriptive tags, and so forth.

BRIEF SUMMARY OF THE INVENTION

According to one embodiment of the present invention, a request to perform a business transaction is received. Responsive to performing a first server process of the business transaction, the servers necessary to perform the business transaction are identified, forming a set of identified servers. A user identity is retrieved for each server in the set of identified servers, wherein the user identity for each server in the set of identified servers is linked to a user registry of a server, forming a set of linked user identities. A data structure comprising the set of linked user identities is created. A user identity for a next server in the set of identified servers is retrieved from the data structure. In addition, the data structure is forwarded to a next server in the set of identified servers.

DETAILED DESCRIPTION OF THE INVENTION

Figure 1:
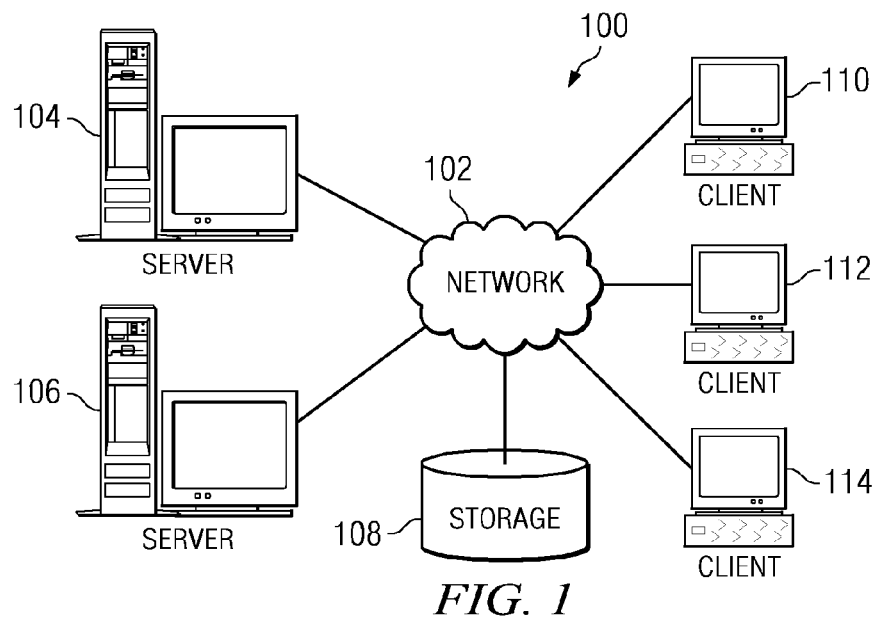
FIG. 1 depicts a pictorial representation of a network of data processing systems in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
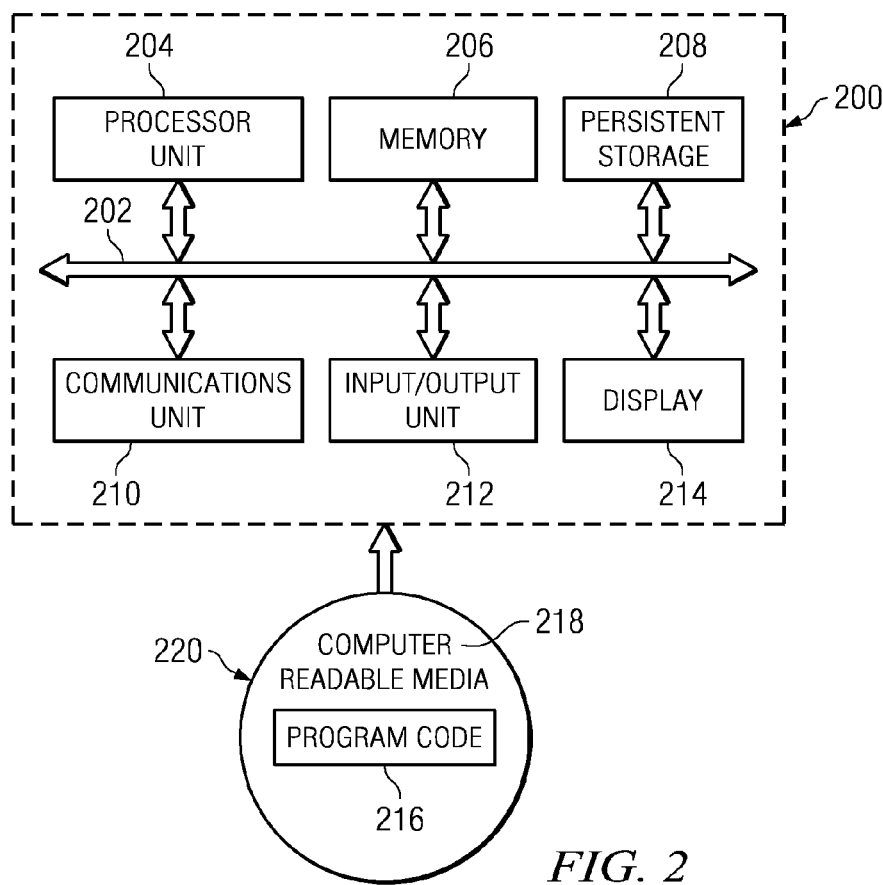
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer recordable storage media. In some instances, computer recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

A problem with current identity mapping solutions is that the identity mapping function is performed by each server locally and only when the identity mapping function is needed, not in a global and proactive manner. Each server independently calls the identity mapping API that usually wraps an LDAP API call to the LDAP server to retrieve the mapped identity that can be used in the call for the next server as part of the business transaction. If there are n servers to achieve the entire business transaction and each server needs to make a separate identity mapping call, there will be n−1 calls in total to the identity mapping server to retrieve all the mapped identities. Performing identity mapping by each server locally may have a significant adverse impact on the performance of the business transaction and the entire system network, considering the enormous number of business transactions a business needs to perform daily.

Identity mapping is a security overhead associated with cascading multiple servers that do not share the same user registry. Identity mapping does not directly contribute value to accomplishing a business transaction. Therefore, a new identity mapping approach that reduces the overhead is desirable.

Exemplary embodiments provide for efficient identity mapping and self-correction for cascaded server systems. Exemplary embodiments significantly increase the efficiency of identity mapping by performing the identity mapping function for an entire business transaction in a global and more proactive manner. Exemplary embodiments retrieve and map all the user identities that are needed during a business transaction at the same time, when the first server in the chain makes an identity mapping request. All the user identities are placed in a data structure referred to as an identity mapping information data block. This data structure is made available to each subsequent server in the chain of servers. Each mapped user identity is linked to the user registry used by the particular server that uses that particular user identity. Thus, each server knows which mapped identity to use from the data structure.

The identity mapping information data block can be re-used when the same user initiates the same transaction later. The data structure can be cached for later use in the local memory or file of the server that first makes an identity mapping call or in the identity mapping server. The identity mapping API may be modified to check the local cache to locate the data structure before connecting to the remote identity mapping server, making it possible to reduce more overhead across multiple business transactions. The mapping API can tell whether the data structure exists locally.

Figure 3:
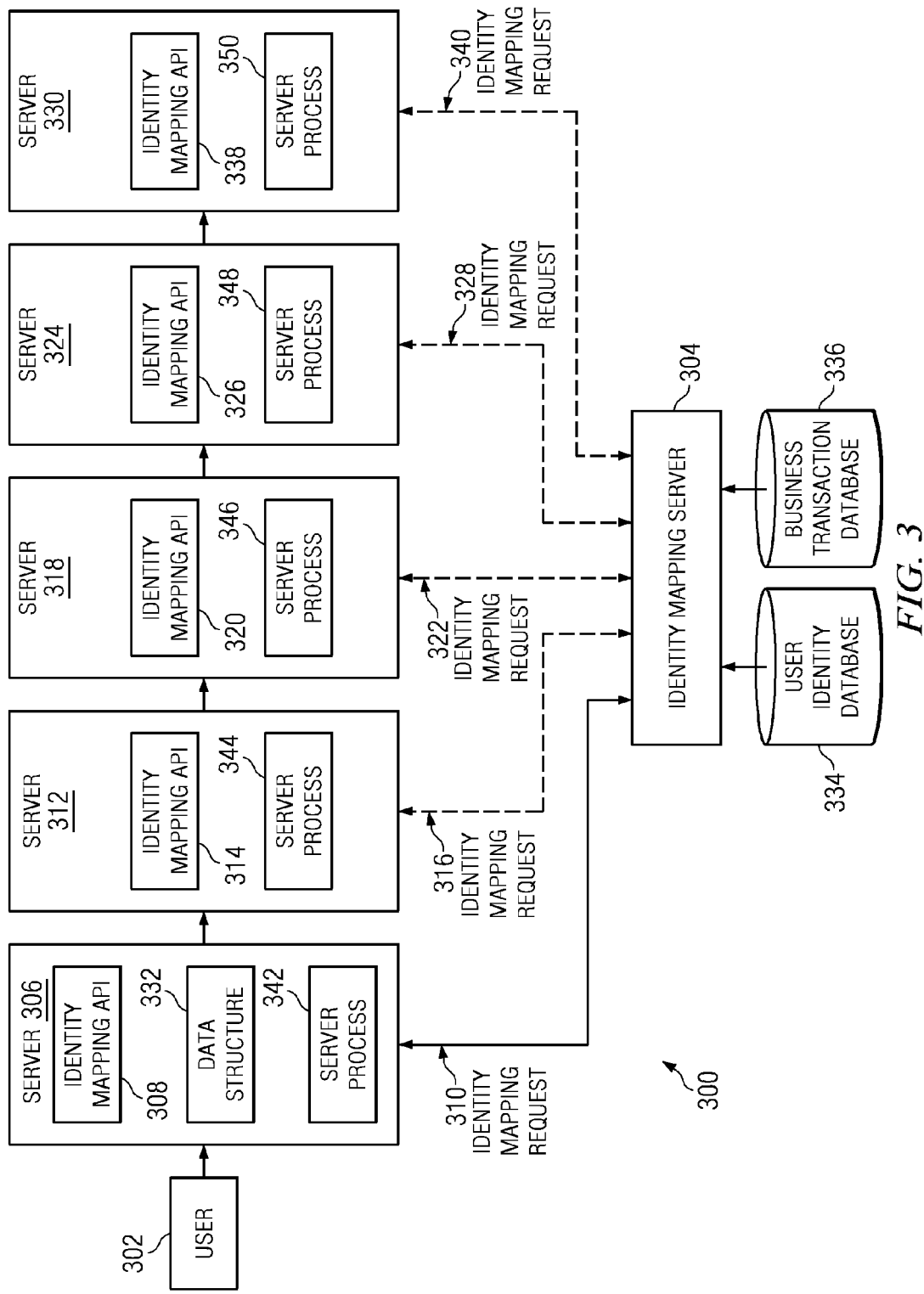
FIG. 3 is a block diagram illustrating a system for efficient identity mapping and self-correction for cascaded server systems in accordance with an exemplary embodiment.

FIG. 3 is a block diagram illustrating a system for efficient identity mapping and self-correction for cascaded server systems in accordance with an exemplary embodiment. System 300 comprises servers 306, 312, 318, 324, and 330, identity mapping server 304, and user 302. Servers 306, 312, 318, 324, and 330 and identity mapping server 304 may be implemented as data processing systems, such as data processing system 200 of FIG. 2. Each server of servers 306, 312, 318, 324, and 330 comprise an instance of an identity mapping API, identity mapping API 308, 314, 320, 326, and 338, respectively and a server process, server processes 342, 344, 346, 348, and 350, respectively. Server processes 342, 344, 346, 348, and 350 represent generic server processes for performing portions of a business transaction. Additionally, while the present exemplary embodiment is depicted as being implemented with five servers, servers 306, 312, 318, 324, and 330, used in a business transaction, alternative exemplary embodiments contemplate and encompass any number of servers being used by and in alternative exemplary business transactions. Further, the more cascaded servers involved in the business transaction, the more benefits of exemplary embodiments are realized. The present exemplary system architecture is not intended to in any way limit the scope of exemplary embodiments.

Identity mapping server 304 comprises user identity database 334 and business transaction database 336. User identity database 334 comprises the user identities for each user for each server in system 300. Further, the user identities in user identity database 334 are linked to the user registry used by the specific server that uses the specific user identity. Business transaction database 336 comprises a set of transactions and the list of servers used in processing or carrying out a business transaction. This list of servers is then used to retrieve all the necessary user identities from user identity database 334 of identity mapping server 304 and build the data structure comprised of the user identities linked to the user registry for each server in the business transaction.

There are different possibilities about where the business transaction database can resides in the system architecture. Thus, in the present exemplary embodiment, the entry for the business transaction in business transaction database 336 comprises a list of servers 306, 312, 318, 324, and 330. In an alternate exemplary embodiment, business transaction database 336 is located on a server other than identity mapping server 304. In another exemplary embodiment, each server in a system, such as servers 306, 312, 318, 324, and 330, each comprise a business transaction database. The business transaction database on each server is comprised of only those transactions for which the server is the first server in the business transaction.

Servers 306, 312, 318, 324, and 330, in system 300 are configured to pass the data structure comprising the identity mapping information data block, data structure 332, between two adjacent servers in the chain of servers. Exemplary embodiments provide for two methods for achieving this goal.

The first option is to pass data structure 332 along with the function call from one server to the next server in the chain. Many client/server protocols used today allow protocol applications to carry extra application data with a protocol call. The identity mapping API will need to be modified to associate the data structure with the protocol call and retrieve the user identity data from the data structure, assuming that the identity mapping module and the module handling the protocol can share an address space on the server.

The second option is to initiate an inter-process communication between the two adjacent servers for passing on the data structure. This communication channel is maintained at the server level so multiple business transactions can use the same channel to pass on identity mapping information. This operation can be performed independently from the normal business function call but the data structure needs to be available when the identity mapping API is called.

User 302 initiates a business transaction that begins with server 306. User 302 may initiate the business transaction with server 306 through use of the Internet, intranet, or some other internal communication. Server 306 invokes identity mapping API 308, which sends identity mapping request 310 to identity mapping server 304. The list of servers used in the business transaction is obtained from business transaction database 336. The user identities for each server in the business transaction are then obtained from user identity database 334. This information is returned to server 306. Identity mapping API 308 then builds data structure 332, which is the identity mapping information data block comprising the user identities linked to the user registry for each server in the business transaction.

Before a server, such as server 306, makes a function call, as part of the business transaction, to the next server, such as server 312, the server first calls the identity mapping API to find out what user identity should be used in the function call. At that time, the identity mapping API connects to the identity mapping server to construct the data structure that contains all the mapped identities to be used by subsequent servers involved in the business transaction. The identity mapping API also returns the user identity that the server, server 306, should be using for the function call to the next server, server 312. The next server, server 312, then performs the portions of the business transaction for which the server is responsible. After server 312 completes server 312's portion of the business transaction, server 312 calls the identity mapping API to retrieve the user identity that should be used for the function call to the next server, server 318. Since the data structure has been passed on to server 312, the identity mapping API can just retrieve the requested information from the data structure resident locally. Using this approach, each identity mapping API will be able to provide the mapped identity to the mapping API's server based on the local data structure, without the need to retrieve the identity from the remote identity mapping server. However, whether a mapped identity is obtained from the local data structure or the remote identity mapping server is totally transparent to the identity mapping caller.

At any point during the business transaction, if a server determines that that the user identity information stored in data structure 332 is incorrect, the server is able to perform self-correction by invoking the identity mapping API to send an identity mapping request to identity mapping server 304 to obtain new user identity information. Identity mapping requests 310, 316, 322, 328 and 340 for servers 312, 318, 324, and 330 respectively, represent the identity mapping requests issued for self-correcting. The dotted lines indicate that these identity mapping requests are not normally part of performing the business transaction and are only issued in the case of an error occurring. Whenever an error correction request occurs, it means all the user identities mapped earlier in the data structure from the current server to the last server may not be valid any more. When a server issues an identity mapping request for the purpose of self-correction, the request determines the servers that have not performed their portions of the business transaction, starting with the issuing server, and gathers the user identities for these remaining servers.

Figure 4:
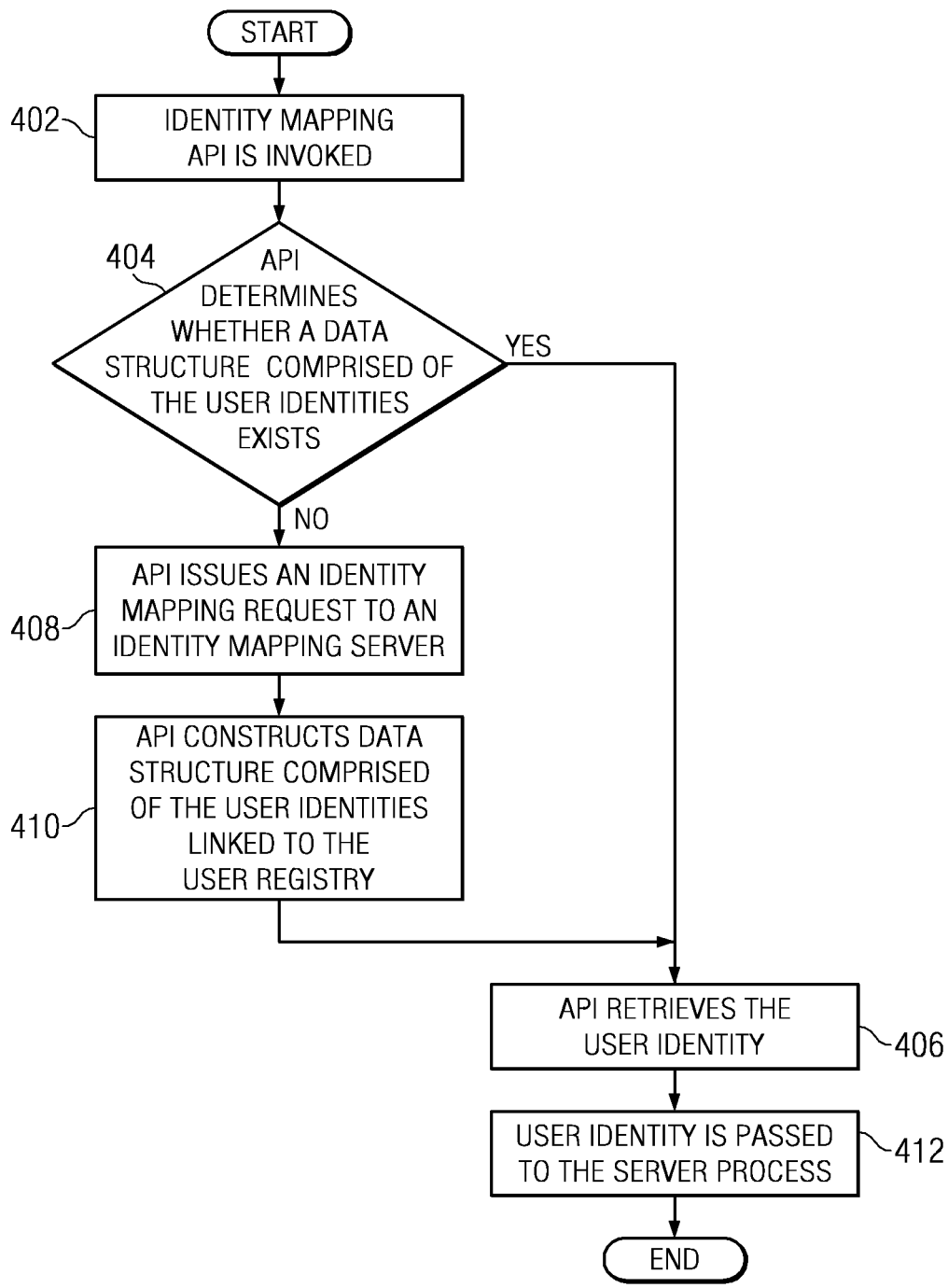
FIG. 4 is a flowchart illustrating the operation of identity mapping in accordance with an exemplary embodiment.

FIG. 4 is a flowchart illustrating the operation of identity mapping in accordance with an exemplary embodiment. FIG. 4 illustrates operations performed on a server, at an API level. The operation of FIG. 4 may be performed by an identity mapping API, such as identity mapping API 308 in FIG. 3. The operation begins when an identity mapping API is invoked (step 402). The identity mapping API determines whether a data structure comprised of the user identities linked to the user registry for each server in the business transaction exists locally (step 404). Responsive to a determination that the data structure exists locally (a "yes" output to step 404), the identity mapping API retrieves the user identity used by the current server for the function call to the next server in the business transaction from the data structure (step 406). The retrieved user identity is passed to the server process requesting the user identification (step 412) and the process ends.

Responsive to a determination that the data structure does not exist (a "no" output to step 404), the identity mapping API issues an identity mapping request to an identity mapping server and retrieves all the user identities for the servers need to perform the business transaction from the identity mapping server (step 408). The identity mapping API constructs a data structure comprised of the user identities linked to the user registry for each server in the business transaction (step 410). The process then proceeds to step 406.

Figure 5:
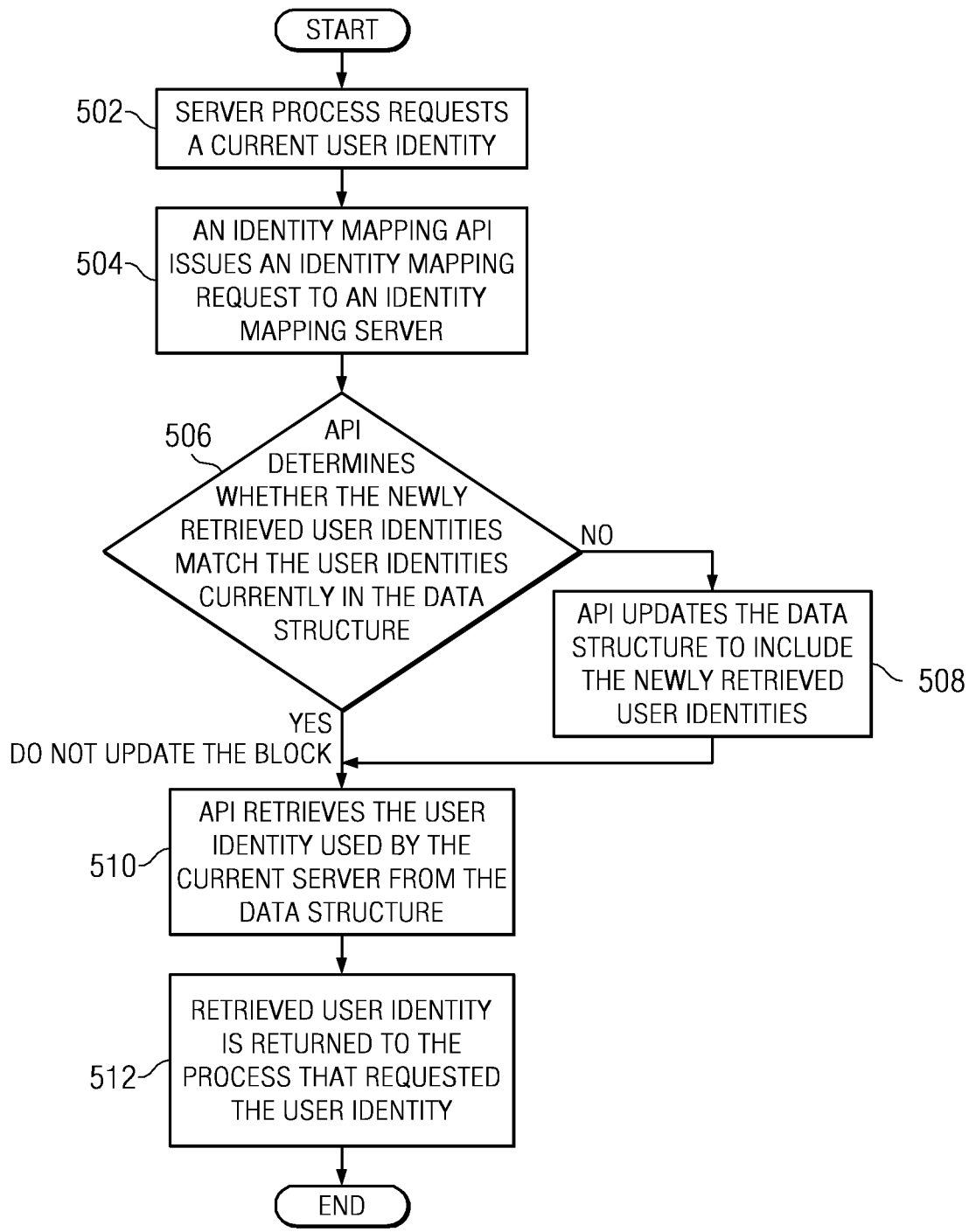
FIG. 5 is a flowchart illustrating the operation of self-correction in accordance with an exemplary embodiment.

FIG. 5 is a flowchart illustrating the operation of self-correction in accordance with an exemplary embodiment. FIG. 5 illustrates operations performed on a server, at an API level. The operation of FIG. 5 may be performed by an identity mapping API, such as identity mapping API 308 in FIG.

3. Responsive to a determination that the user identity for the next server retrieved from a data structure comprised of the user identities linked to the user registry for each server in the business transaction is incorrect, the server process requests a new user identity from the identity mapping API (step 502). Note that the server process will not know whether the user identity is correct or incorrect until the server process makes a function call to the next server in the business transaction. The identity mapping API issues an identity mapping request to an identity mapping server and retrieves the user identities for the servers in the business transaction that have yet to perform their portions of the business transaction, wherein the current server is used as the starting point (step 504). The identity mapping API determines whether the newly retrieved user identities match the user identities currently in the data structure (step 506). Responsive to a determination that the newly retrieved user identities do not match the user identities currently in the data structure (a "no" output to step 506), the identity mapping API updates the data structure to include the newly retrieved user identities (step 508). The identity mapping API retrieves the user identity used by the current server for the function call to the next server from the data structure (step 510). The retrieved user identity is returned to the server that requested the user identity (step 512) and the process ends.

Responsive to a determination that the newly retrieved user identities match the user identities currently in the data structure (a "yes" output to step 506), the identity mapping API does not update the data structure and retrieves the user identity used by the current server for the function call to the next server from the data structure (step 510). The retrieved user identity is returned to the process that requested the user identity (step 512) and the process ends. In the present example, the data structure was not updated. This means that the user mapping information in the data structure is already correct. Thus, the error was caused by another reason and needs to be handled by the server, which is beyond the scope of the present disclosure.

Figure 6:
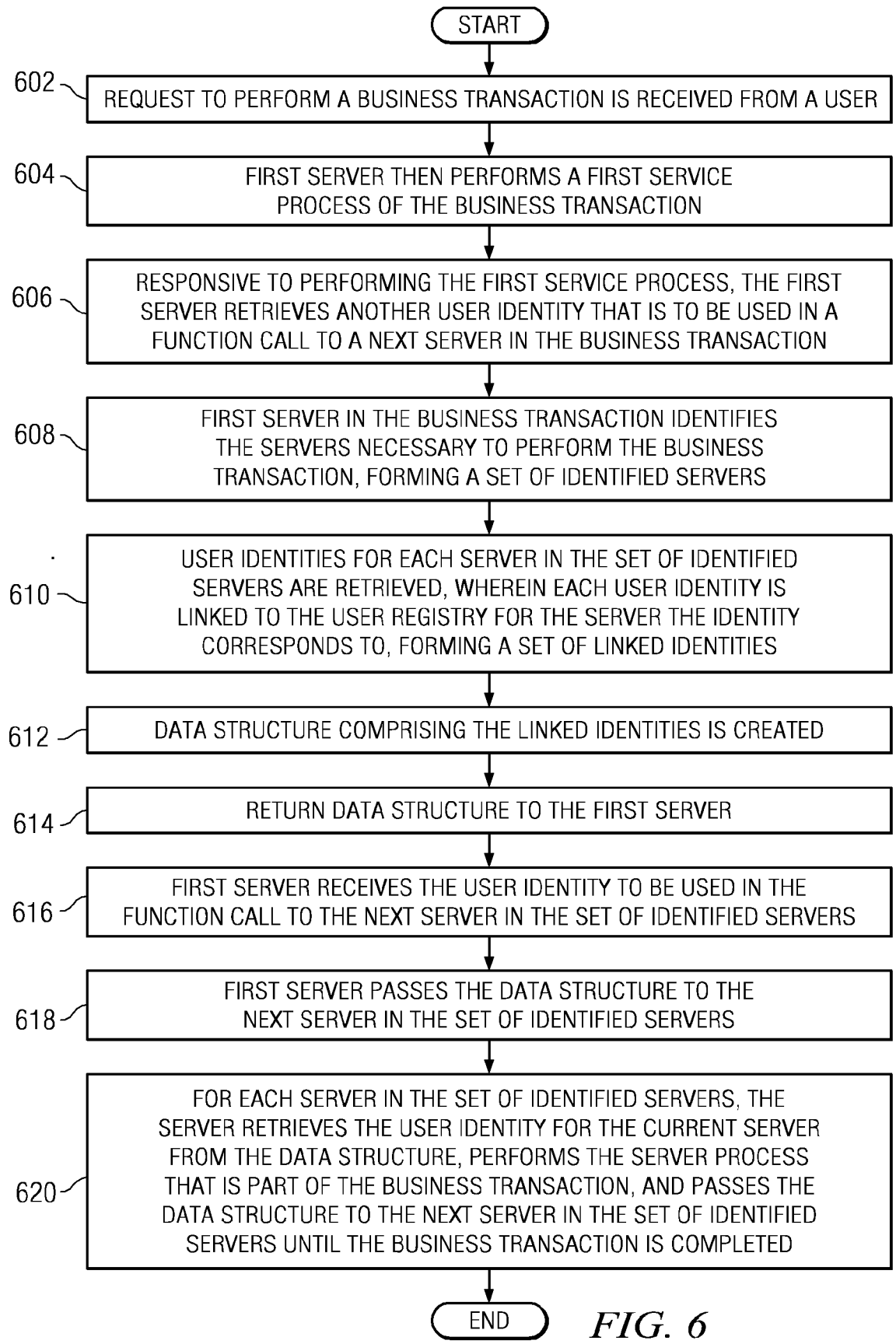
FIG. 6 is a flowchart illustrating the operation of efficient identity mapping and self-correction for cascaded server systems.

FIG. 6 is a flowchart illustrating the operation of efficient identity mapping and self-correction for cascaded server systems. The operation of FIG. 6 may be performed by various identity mapping APIs in a cascaded server system, such as system 300 in FIG. 3. The operation begins when a request to perform a business transaction is received from a user (step 602). The user identity for the first server is usually provided by the user making the request directly, typically via an authentication process. The first server then performs a first service process of the business transaction (step 604). Responsive to performing the first server process, the first server retrieves another user identity that is to be used in a function call to the next server in the business transaction (step 606). The first server retrieves the user identity by calling an identity mapping API, which, in turn retrieves the identity from an identity mapping server. The first server in the business transaction identifies the servers necessary to perform the business transaction, forming a set of identified servers (step 608). The first server uses the identity mapping API to identify the set of identified servers. When the identity mapping API connects to the identity mapping server, based on the business transaction the first server is part of, as specified as part of the user request, the identity mapping server can determine what other servers are involved in the business transaction. The servers necessary for the business transaction are stored in a data repository, such as a business transaction database, which may be stored on the identity mapping server, the first server in the business transaction or another separate server, for example, which the identity mapping API contacts and retrieves the information from.

The user identities for each server in the set of identified servers are retrieved, wherein each user identity is linked to the user registry for the server the identity corresponds to, forming a set of linked identities (step 610). A data structure comprising the linked identities is created (step 612) and returned to the first server (step 614). The identity mapping server retrieves the user identities, creates the data structure, and returns the data structure to the mapping API of the first server. The first server receives the user identity to be used in the function call to the next server in the set of identified servers (step 616). The first server receives the user identity to be used in the function call to the next server in the business transaction from the identity mapping API. The first server passes the data structure to the next server in the set of identified servers (step 618).

Then, for each server in the set of identified servers, the server retrieves the user identity for the current server from the data structure, performs the server process that is part of the business transaction, and passes the data structure to the next server in the set of identified servers until the business transaction is completed (step 620) and the process ends. If an error in the user identity for any server is detected by a server when performing the server operation that is part of the business transaction, a self-correction process, such as the process detailed in FIG. 5, is invoked to update the set of user identities. The data structure is updated if any new user identity information is found.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for identity mapping for a cascaded server system, the computer-implemented method comprising:

receiving, at a first server in the cascaded server system, a request to perform a business transaction;

responsive to the first server performing a first server process of the business transaction, identifying, by the first server, remaining servers for performing a set of remaining server processes of the business transaction to form a set of identified servers;

retrieving a user identity for each server in the set of identified servers, wherein the user identity for each server in the set of identified servers is linked to a user registry of a server to form a set of linked user identities;

generating a data structure comprising the set of linked user identities;

responsive to identifying, at the first server, information desired from a next server in the set of identified servers to perform a next server process of the business transaction in order to perform the business transaction, retrieving, at the first server, a next user identity for the next server in the set of identified servers from the data structure;

forwarding, from the first server, the data structure to the next server in the set of identified servers; and repeating, for each server in the set of identified servers actions comprising:

performing a service process of a current server;

retrieving a subsequent user identity for a subsequent server in the set of identified servers from the data structure, wherein the subsequent user identity is different than a current user identity for the current server; and forwarding the data structure to the subsequent server in the set of identified servers, wherein the set of identified servers include a plurality of servers.

2. A computer-implemented method for identity mapping for a cascaded server system, the computer-implemented method comprising:

receiving, at a first server in the cascaded server system, a request to perform a business transaction;

responsive to the first server performing a first server process of the business transaction, identifying, by the first server, remaining servers for performing a set of remaining server processes of the business transaction to form a set of identified servers;

retrieving a user identity for each server in the set of identified servers, wherein the user identity for each server in the set of identified servers is linked to a user registry of a server to form a set of linked user identities;

generating a data structure comprising the set of linked user identities;

responsive to identifying, at the first server, information desired from a next server in the set of identified servers to perform a next server process of the business transaction in order to perform the business transaction, retrieving, at the first server, a next user identity for the next server in the set of identified servers from the data structure; and forwarding, from the first server, the data structure to the next server in the set of identified servers, wherein retrieving a user identity for the next server of the set of identified servers from the data structure comprises:

identifying the user registry for the next server in the set of identified servers, to form a next registry; and selecting the user identity in the data structure linked to the next registry.

3. A computer program product for identity mapping for a cascaded server system, the computer program product comprising:

a computer readable storage device having computer usable program code tangibly embodied thereon, the computer usable program code comprising:

computer usable program code for receiving, at a first server in the cascaded server system, a request to perform a business transaction;

computer usable program code for, responsive to the first server performing a first server process of the business transaction, identifying, by the first server, remaining servers for performing a set of remaining server processes of the business transaction to form a set of identified servers;

computer usable program code for retrieving a user identity for each server in the set of identified servers, wherein the user identity for each server in the set of identified servers is linked to a user registry of a server to form a set of linked user identities;

computer usable program code for generating a data structure comprising the set of linked user identities;

computer usable program code for, responsive to identifying, at the first server, information desired from a next server in the set of identified servers to perform a next server process of the business transaction in order to perform the business transaction, retrieving, at the first server, a next user identity for a next server in the set of identified servers from the data structure;

computer usable program code for forwarding, from the first server, the data structure to the next server in the set of identified servers; and computer usable program code for repeating, for each server in the set of identified servers, the computer usable program code for:

performing a service process of a current server;

retrieving a subsequent user identity for a subsequent server in the set of identified servers from the data structure, wherein the subsequent user identity is different than a current user identity for the current server; and forwarding the data structure to the subsequent server in the set of identified servers, wherein the set of identified servers include a plurality of servers.

4. A computer program product for identity mapping for a cascaded server system, the computer program product comprising:

a computer readable storage device having computer usable program code tangibly embodied thereon, the computer usable program code comprising:

computer usable program code for receiving, at a first server in the cascaded server system, a request to perform a business transaction;

computer usable program code for, responsive to the first server performing a first server process of the business transaction, identifying, by the first server, remaining servers for performing a set of remaining server processes of the business transaction to form a set of identified servers;

computer usable program code for retrieving a user identity for each server in the set of identified servers, wherein the user identity for each server in the set of identified servers is linked to a user registry of a server to form a set of linked user identities;

computer usable program code for generating a data structure comprising the set of linked user identities;

computer usable program code for, responsive to identifying, at the first server, information desired from a next server in the set of identified servers to perform a next server process of the business transaction in order to perform the business transaction, retrieving, at the first server, a next user identity for a next server in the set of identified servers from the data structure;

computer usable program code for forwarding, from the first server, the data structure to the next server in the set of identified servers, wherein the computer usable program code for retrieving a user identity for the next server of the set of identified servers from the data structure comprises:

computer usable program code for identifying the user registry for the next server in the set of identified servers, to form a next registry; and computer usable program code for selecting the user identity in the data structure linked to the next registry.

5. A data processing system for identity mapping for a cascaded server system, the data processing system comprising:

a bus;

a storage device connected to the bus, wherein the storage device contains computer usable code;

a communications unit connected to the bus; and a processing unit connected to the bus, wherein the processing unit executes the computer usable code to:

receive, at a first server in the cascaded server system, a request to perform a business transaction;

responsive to the first server performing a first server process of the business transaction, identify, at the first server, remaining servers for performing a set of remaining server processes of the business transaction to form a set of identified servers;

retrieve a user identity for each server in the set of identified servers, wherein the user identity for each server in the set of identified servers is linked to a user registry of a server to form a set of linked user identities; generate a data structure comprising the set of linked user identities;

responsive to identifying, at the first server, information desired from a next server in the set of identified servers to perform a next server process of the business transaction in order to perform the business transaction, retrieve, at the first server, a next user identity for the next server in the set of identified servers from the data structure; and forward, from the first server, the data structure to the next server in the set of identified servers, wherein the processing unit further executes the computer usable code to repeat, for each server in the set of identified servers, execution of the computer usable program code to:

perform a service process of a current server;

retrieve a subsequent user identity for a subsequent server in the set of identified servers from the data structure, wherein the subsequent user identity is different than a current user identity for the current server; and forward the data structure to the subsequent server in the set of identified servers, wherein the set of identified servers include a plurality of servers.

6. A data processing system for identity mapping for a cascaded server system, the data processing system comprising:

a bus;

a storage device connected to the bus, wherein the storage device contains computer usable code;

a communications unit connected to the bus; and a processing unit connected to the bus, wherein the processing unit executes the computer usable code to:

receive, at a first server in the cascaded server system, a request to perform a business transaction;

responsive to the first server performing a first server process of the business transaction, identify, at the first server, remaining servers for performing a set of remaining server processes of the business transaction to form a set of identified servers;

retrieve a user identity for each server in the set of identified servers, wherein the user identity for each server in the set of identified servers is linked to a user registry of a server to form a set of linked user identities; generate a data structure comprising the set of linked user identities;

responsive to identifying, at the first server, information desired from a next server in the set of identified servers to perform a next server process of the business transaction in order to perform the business transaction, retrieve, at the first server, a next user identity for the next server in the set of identified servers from the data structure; and forward, from the first server, the data structure to the next server in the set of identified servers, wherein the processing unit executing the computer usable code to retrieve a user identity for the next server of the set of identified servers from the data structure comprises the processing unit executing the computer usable program code to:

identify the user registry for the next server in the set of identified servers, to form a next registry; and select the user identity in the data structure linked to the next registry.

* * * * *